United States Patent [19]

Adamo

[11] 4,013,995
[45] Mar. 22, 1977

[54] VEHICLE BURGLAR ALARM

[76] Inventor: Joe J. Adamo, 7306 Grovewood Lane, Orange, Calif. 92669

[22] Filed: Oct. 24, 1975

[21] Appl. No.: 625,402

[52] U.S. Cl. .................. 340/65; 340/261; 200/61.45 R
[51] Int. Cl.² ...................... B60R 25/10
[58] Field of Search ........... 340/52 H, 65, 63, 261, 340/276, 280; 200/61.48, 61.52, 61.45 R

[56] References Cited
UNITED STATES PATENTS

| 1,779,986 | 10/1930 | Scott | 340/65 |
| 3,160,868 | 12/1964 | Kowanda | 340/65 X |

*Primary Examiner*—Alvin H. Waring
*Attorney, Agent, or Firm*—Knobbe, Martens, Olson, Hubbard & Bear

[57] ABSTRACT

A vibration sensitive intrusion alarm system for protecting the vehicle against theft and as a self-contained portable vibration sensitive alarm system.

3 Claims, 5 Drawing Figures

VEHICLE BURGLAR ALARM

BACKGROUND OF THE INVENTION

This invention relates to intrusion alarm systems and, more particularly, to alarm systems which are adapted to sense vibratory movement.

Intrusion alarms have been marketed for a substantial period of time and include a variety of sensing mechanisms which vary from extremely simple switches mounted across doorways or windows to extremely complex electronic apparatus for monitoring changes in magnetic reluctance or dielectric properties of an area to be protected. In the particular field of vehicle intrusion alarms, the vast majority of alarm systems are connected to sense the opening of vehicle doors only, particularly by monitoring the switches normally associated with each of the doors for illuminating a dome light. When any of these switches are closed, in addition to activating the dome light, the intrusion alarm systems activate an alarm mechanism such as the vehicle horn or a siren. In at least one prior art vehicle intrusion alarm system, a vibration sensitive element is included which incorporates a suspended weight which senses vibration. This prior art system uses a pair of contact points positioned on the suspension mechanism removed from the weight to sense vibration of the weight element. Since the movement of the suspension system adjacent the contact points is extremely slight, adjustment of the sensitivity of this prior art system is difficult. Furthermore, with such prior art systems, it has been common to operate the alarm mechanism directly from the contact points associated with the inertia sensing element, so that the points must carry a substantial current load. This often leads to eventual fusing of the contact points and a resulting malfunction of the alarm system.

In the general field of intrusion alarms, most alarm systems, regardless of the sensing mechanism, must be permanently attached and wired into the area or device being protected so that the alarm system itself substantially increases the cost of the protected item.

SUMMARY OF THE INVENTION

The present invention alleviates these and other difficulties associated with the prior art by providing an intrusion alarm system which is responsive to vibration through an inertia switch member. This inertia switch member includes an elongate metallic strap element biased to a predetermined position by an underlying leaf spring and rigidly mounted at one end such that the free end of the elongate member may be positioned adjacent a contact plate. Any movement of the mounting mechanism will generate an oscillation in the elongate metallic member causing a contact with the contact plate. This inertia switch element is connected through an electronic amplifier to the warning signal device so that only relatively small currents are drawn through the inertia switch, protecting this switch member from fusing or other damage which might occur if larger currents caused arcing across the switch contacts. The electronic circuit associated with the present intrusion alarm includes a time delay mechanism which latches the amplifying circuit to sound the alarm for a predetermined period of time after the initial contact is made by the inertia switch contact member. Repeated actuations of the inertia switch member will extend the original alarm time period, such that the alarm will sound until a predetermined time after the last contact of the inertia switch member.

This system is disclosed in two embodiments, the first of which is incorporated as a part of the wiring system within a vehicle such as an automobile or truck. The inertia switch member is then capable of monitoring any vibration of the vehicle as would occur, for example, if a door were opened or equipment were removed from the exterior of the vehicle. Furthermore, this intrusion alarm will sound if an attempt is made to tow the vehicle. This latter feature is extremely important since it will be recognized that most intrusion alarm systems will not function if a vehicle is simply towed away by a thief.

A second embodiment of the present invention provides the inertia switch, the electronic circuit, a power source and the alarm signal device, such as a siren, in a self-contained, portable apparatus. This apparatus may include an exterior key switch on a housing surrounding the alarm system to activate the alarm system. Through the use of such a portable, self-contained alarm system it is possible to protect a variety of valuable objects. Thus, for example, if a vehicle, such as a school bus, is driven during a normal working day and thus protected by the driver, but is parked in a yard at night, it is possible to place the self-contained embodiment of the present intrusion alarm on the exterior of the vehicle while it is parked in the yard. Thus, anyone attempting to tamper with either the alarm itself or the vehicle will generate sufficient vibration to activate the alarm to warn those in the vicinity that an intrusion is occurring. In addition to the protection of vehicles, it will be readily recognized that the portable, self-contained embodiment is adapted to being placed on any valuable object to protect that object from theft, and may even be used to protect a dwelling or other area by mounting the self-contained unit on a fence or door which would be vibrated if an intrusion occurred.

These and other advantages of the present invention are best understood through a reference to the drawings, in which.

DETAILED DESCRIPTION OF THE PREFERRED EMBODIMENT

Figure 1:
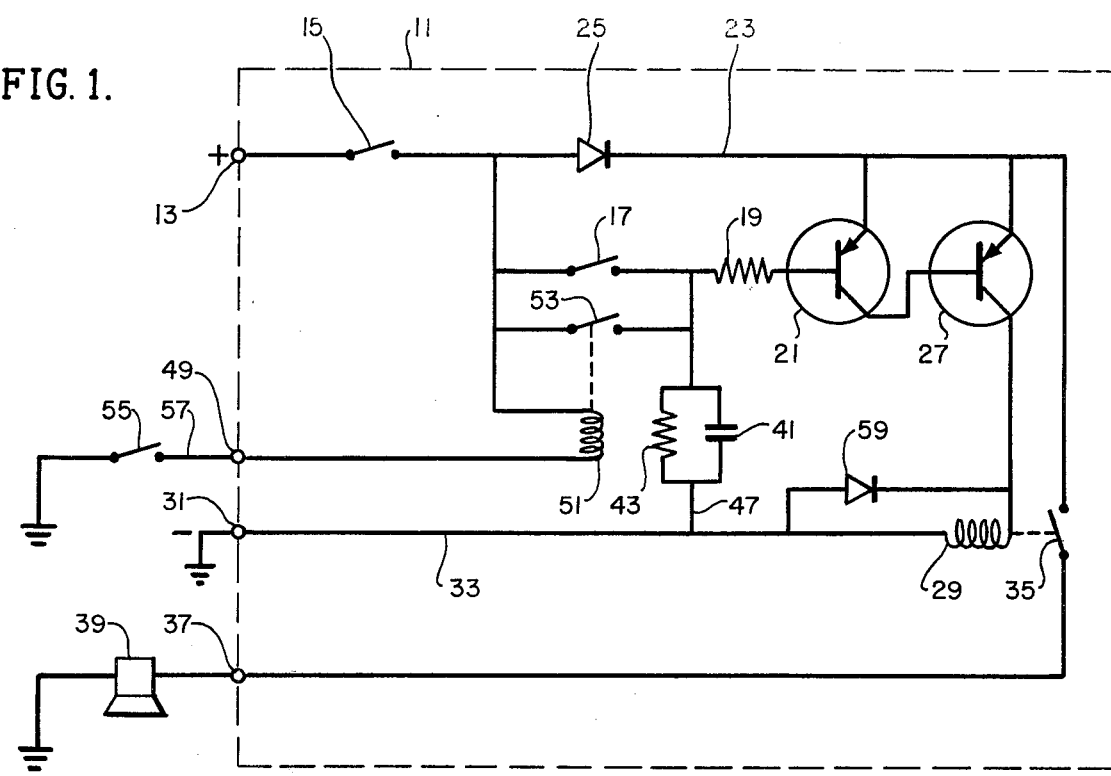
FIG. 1 is an electrical schematic diagram showing the interconnections of the present invention for permanent installation to protect a vehicle from theft.

Referring initially to FIG. 1, a housing shown diagrammatically at 11 contains plural electronic elements for interconnection with the wiring harness of a vehicle, such an automobile or truck, for protecting the vehicle from theft. A terminal 13 on the exterior of the housing 11 is connected to the positive terminal of the vehicle battery to provide power for the alarm system. This terminal 13 is connected through a key switch 15 to a sensitive inertia switch 17 used to activate the alarm. The key switch 15 is preferably a switch similar to a vehicle ignition switch which may be mounted on the exterior of the housing 11 in a position which is accessible to the vehicle operator. Thus when the vehicle operator wishes to energize the intrusion alarm system, he can activate the switch 15 with a key. Alternately, and preferably, the key switch 15 may be located outside of the housing 11 and separately mounted, for example, on the exterior of the vehicle so that the vehicle operator may lock his vehicle and then use a key to close the key switch 15 to activate the alarm system.

The inertia switch 17 will be described in detail below. For the purpose of the present explanation, it is sufficient to note that the inertia switch 17 will close in response to a predetermined degree of vibration of the vehicle in which the housing 11 is mounted. The inertia switch 17 connects the positive battery potential from the battery terminal 13 through a current limiting resistor 19 to the base of an amplifying transistor 21. It will be understood that the current drawn through the base of the transistor 21 is extremely small in comparison with the current required to activate an alarm signal device, so that the inertia switch 17 need only draw this relatively small current. The emitter of the transistor 21 is connected to a positive bus 23 which is, in turn, connected through a polarity reversal protecting diode 25 to the key switch 15. The diode 25 will protect the transistor 21 and remaining elements of the electronic circuit from an accidental polarity reversal when the battery of the vehicle is connected to the intrusion alarm. The collector of the transistor 21 is connected to the base of a second amplifying transistor 27, the emitter of which is connected to the positive power bus 23. The pair of transistors 21 and 27 substantially amplify the electrical signal from the inertia switch 17 to provide electrical current from the positive bus 23 through the emitter-collector junction of transistor 27 to a relay coil 29 connected to the collector of the transistor 27. The remaining terminal of the relay coil 29 is connected to the negative battery terminal through a terminal connector 31 and a negative power bus 33. A single-pole-single-throw contact 35, which is normally open, is activated by current flowing through the relay coil 29 and is interconnected between the positive power bus 23 and a terminal connector 37 which may be directly connected to the vehicle horn 39 or to any other alarm signal device, such as a siren, the second terminal of which is connected to the same return ground path as the battery negative terminal.

From the proceeding description it will be seen that, if the key switch 15 is closed and the inertia switch 17 is closed, current will flow through the current limiting resistor 19 to bias the transistor 21 to conduction, which conduction will in turn bias the transistor 27 to conduction, such that current is drawn from the positive power bus through the relay coil 29 to close the switch contacts 35. This closure of the switch contacts 35 connects the horn 39 or other signaling device to the positive power bus 23, activating the horn 39.

A time delay latching circuit is provided in the alarm system and includes a parallel combination of a capacitor 41 and resistor 43 connected to the junction of the inertia switch 17 and resistor 19 by a conductor 45, and additionally connected to the negative power bus 33 by a conductor 47. When the inertia switch 17 is momentarily closed, it will bias the transistors 21 and 27 to conduction as previously described, and will simultaneously charge the capacitor 41 from the positive power bus 23. If the inertia switch 17 is opened, a charge will remain on the capacitor 41, maintaining a positive bias on the conductor 45, so that biasing current will continue to flow through the resistor 19 to maintain the transistors 21 and 27 conductive. The potential across the capacitor 41 will be reduced by the current drain through the current limiting resistor 19 and the base-to-collector junction of the transistor 21, and will additionally be reduced by current drain through the shunting resistor 43. The time required to bleed the charge from the capacitor 41 may therefore be adjusted by changing the value of the resistance 43 so that, in response to a momentary actuation of the inertia switch 17, the horn 39 may be activated for any selected time interval.

If, during the period of time when the capacitor 41 is discharging through the base of the transistor 21 and the resistor 43, the inertia switch 17 is again closed, this closure, although momentary, will again fully charge the capacitor 41, initiating a new discharge period. Thus, the horn 39 will continue to sound for the predetermined time period set by the capacitor 41 and resistor 43 after each closure of the inertia switch 17, and the horn 39 will therefore be activated until the predetermined time period has elapsed after the last closure of the inertia switch 17.

It will be understood that the operation of the capacitor 41 and resistor 43 to latch the amplifying circuit 21, 27 for a predetermined time is more advantageous than simply latching this amplifier circuit 21, 27 indefinitely. Thus, for example, in a typical example of this embodiment which has been constructed, the time constant of the network 41, 43 is set at approximately 40 seconds. The horn 39 will therefore sound for 40 seconds after actuation of the inertia switch. This is normally a sufficient time to ward off an intruder, particularly since the horn will again begin to sound if he attempts to reintrude the vehicle. On the other hand, the 40 second operation of the horn 39 is insufficient to deplete the vehicle battery so that, if the actuation of the inertia switch 17 is accidental, as may be caused by a wind gust or other vibration of the vehicle, the horn 39 will sound for a period of time insufficient to deplete the vehicle battery and the system will remain activated so that any later intrusion will cause a sounding of the horn 39.

In the embodiment shown in FIG. 1, an additional activating circuit is included, comprising a terminal 49 external to the housing 11 connected to one terminal of a relay coil 51. The other terminal of the relay coil 51 is connected to the positive voltage bus 23. The relay coil 51, when energized, closes a single-pole switch 53 connected in parallel to the inertia switch 17. The external terminal 49 is connected to the standard, normally open door switch 55 which is, in turn, connected to ground. Thus, when the door of the vehicle is opened, the normally open door switch 55 will close to activate the vehicle dome light. In addition, the vehicle dome light conductor 57 grounds the terminal 49 permitting a current flow through the relay coil 51. This current flow activates the switch 53, biasing the transistors 21 and 27 to conduction as previously explained, and initiating a time period predetermined by the values of the capacitors 41 and 43, and sounding the horn 39 for this predetermined time period.

A diode 59 may advantageously be connected in parallel with the relay coil 29 and has a polarity opposite the normal current flow through the relay coil 29. This diode 59 will shunt any oscillations which might otherwise occur in the relay coil 29 upon deactuation. By shunting such oscillation, the diode 59 prohibits magnetic induction from the relay coil 29 to the base lead of the transistor 21 which might otherwise generate a false initiation of the timing sequence.

Figure 2:
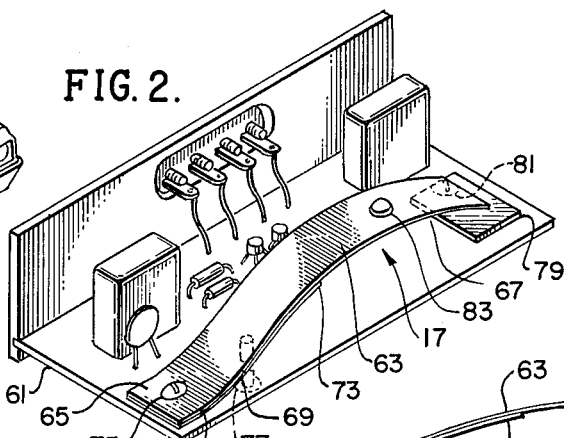
FIG. 2 is a perspective view of the inertia switch used to activate the alarm system of FIG. 1.
Figure 3:
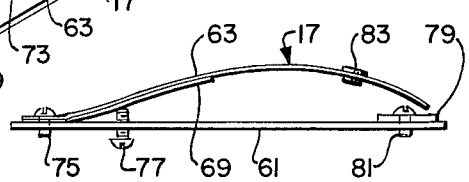
FIG. 3 is an elevation view of the inertia switch of FIG. 2.

Referring now to FIGS. 2 and 3, the details of construction of the inertia switch 17 will be described. It should be understood that the inertia switch 17 is rigidly mounted within the housing 11 of the alarm system of FIG. 1 and may be, for example, mounted onto a printed circuit board 61 which is in turn rigidly mounted to the housing 11. The circuit board 61 is mounted in a horizontal plane within the housing 11 and vehicle, with the inertia switch 17 mounted on top of the board 61. The inertia switch 15 comprises an elongate ribbon of thin stainless steel 63 which is bent to include a relatively short flat portion 65 and an elongate, arcuately shaped portion 67. Underlying the flat portion 65 and a short length of the arcuate portion 67 is a spring steel member 69. This spring steel member 69 also includes a relatively short flat portion 71 underlying the flat portion 65 and a second flat portion 73 bent at a slight angle relative the flat portion 71. The flat portions 65 and 71 of the members 63 and 69, respectively, are rigidly mounted to the circuit board 61 by a screw 75 which passes through the circuit board 61 and is attached thereto by threading directly into an aperture in the circuit board 61. This attachment provides cantilever mounting for the members 63 and 69. Electrical contact may be made to the screw 75 from circuits printed on the printed circuit board 61 to form a first contact with the inertia switch member 17.

An additional screw 77 is threaded through an aperture in the printed circuit board 61 from beneath the printed circuit board 61 to bear against the spring steel member 69 at a location short of the free end of the spring steel member 69. The screw 77 may be adjusted by screwing it into and out of the aperture within the printed circuit board 61 to raise and lower the spring steel member 69 and thus raise and lower the stainless steel member 63.

A contact plate 79 is mounted on the printed circuit board 61 by a screw 81 which is threaded through an additional aperture in the printed circuit board 61. The screw 81 may be connected to printed circuits on the board 61 to complete the remaining electrical connection to the switch 17. The contact plate 79 is made of stainless steel so that the pair of members 63 and 79 form stainless steel contacts for the switch 17 which will not deteriorate from use or environmental causes. In addition, the use of stainless steel, which has a low spring constant, for the member 63 provides a relatively limp, elongate inertial member which is extremely sensitive to vibratory movements of the switch assembly 15.

If desired, a relatively heavy rivet 83 may be attached to the stainless steel member 63 adjacent the free end to increase the sensitivity of the switch 17 to vibratory movements. In order to adjust the sensitivity of the inertia switch 17, the screw 77 is adjusted relative the circuit board 61 to raise or lower the spring steel member 69 and stainless steel member 63 so that the free end of the stainless steel member 63 is slightly spaced from the contact plate 79. By changing this slight spacing, the overall sensitivity of the inertia switch 17 may be adjusted. The spring steel member 69 provides the resilience required for the switch 17, since, as mentioned previously, the stainless steel member 63 has a relatively low spring constant. Thus, the use of stainless steel for the members 63 and 79 provides the long wearing contact points for the switch 17, while the use of the spring steel member 69 provides the desired resilience for sensing vibration.

With the inertia switch 17 properly adjusted so that only a very small gap is present between the free end of the stainless steel member 63 and the contact plate 79, the system shown in FIG. 1 will be sensitive to very slight vehicle vibrations, sounding the horn 39 for a period of approximately 40 seconds, or any other desired period, after actuation of the switch 17.

Figure 5:
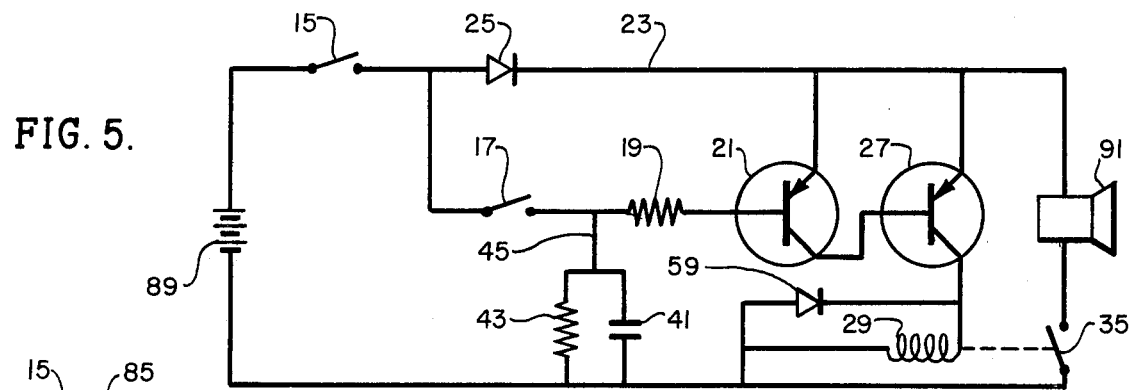
FIG. 5 is an electrical schematic diagram showing the interconnection of elements of the self-contained alarm system of FIG. 4.
Figure 4:
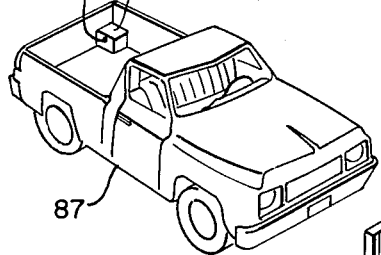
FIG. 4 is a perspective view showing an alternate, self-contained embodiment of the present invention positioned on a vehicle for protecting the vehicle from theft.

Referring now to FIGS. 4 and 5, an alternate, self-contained, portable embodiment of the present invention will be described. In this embodiment, the alarm system is contained within a completely enclosed housing 85, having only the key switch 15 mounted externally for access by an operator. This housing 85 may be placed on any object to be protected. Thus, in the view shown in FIG. 4, the housing 85 is located in the bed of a truck 87 which may be carrying valuable tools or equipment. When the truck 87 is parked and vacated by the vehicle operator, the operator may turn on the key switch 15, remove the key therefrom, and leave the vehicle unattended. Any attempt by an intruder to enter the vehicle 87 itself or to remove objects from the bed of the truck 87 will result in a vibration of the housing 85 and a resultant actuation of the alarm system. Similarly, any attempt to deactivate the alarm system itself will cause vibration of the housing 85 which will activate the alarm. The circuit within the housing 85 is shown in FIG. 5. Those elements which are identical to elements of the circuit of FIG. 1 are labeled with identical numbers. This circuit includes, in addition to those elements shown in FIG. 1, a self-contained battery 89 which is series connected to the key switch 15 and inertia switch 17. In addition, the housing 85 includes the transistor amplifier circuit 21, 27, as well as the timing circuit 41, 43, and a self-contained alarm signal device, such as a siren 91. The remainder of the circuit operates in a manner which is identical to the operation of the circuit of FIG. 1, that is, any vibration of the housing 85 will activate the inertia switch 17 so that, if the key switch 15 is closed, the siren 91 will be operated by a closure of the switch contacts 35. The siren 91 will remain in an activated state until discharge of the capacitor 41 through the resistor 43 has occurred, typically for approximately 40 seconds.

It will be understood, therefore, that, using the embodiment of FIGS. 4 and 5, the self-contained alarm system within the housing 85 may normally be stored away from the object, such as the vehicle 87 which is to be protected, and may be placed on the vehicle when the vehicle is parked to protect the vehicle 87. It will also be readily recognized that this self-contained portable alarm system is useful for protecting a variety of valuable items and areas, as well as dwellings. Thus, the alarm system within the housing 85 may be hung on the side of a chain link fence so that anyone attempting to climb the fence will vibrate the housing 85 and activate the alarm. Similarly, the housing 85 may be placed on a door or window so that, when these items are jarred, the alarm will be activated. In summary, the housing 85 may be placed on any item to be protected, and will sound if either that item or the alarm system itself is vibrated, as would occur, for example, if a theft or deactivation of the alarm were attempted.

What is claimed is:

1. An alarm system for monitoring vibration of a device to be protected, comprising:
    an elongated, thin metal strap cantilever mounted at one end on said device and free at the other end;
    a contact plate mounted on said device adjacent said free end of said metal strap and spaced from said free end by a gap;
    a signaling device connected to said strap and said plate and activated by contact therebetween;
    electronic amplifier means for activating a signaling mechanism for a predetermined period of time in response to a single contact between said strap and said plate, and
    means for extending said predetermined period of time in response to each successive contact between said strap and said plate.

2. The alarm system as defined in claim 1 wherein the means for extending said predetermined period of time in response to each successive contact between said strap and said plate comprises
    means for using the discharge time constant of a resistor-capacitor network as determining the response period to each contact, and
    recharging the capacitor upon each successive contact whereby said response period is renewed.

3. The system as defined in claim 1 in which the metal strap cantilever is made from stainless steel.

* * * * *